June 23, 1936.    G. M. BOUTON ET AL    2,044,763
MAINTAINING CABLE SHEATH
Filed Sept. 28, 1935    3 Sheets-Sheet 1
FIG. 1
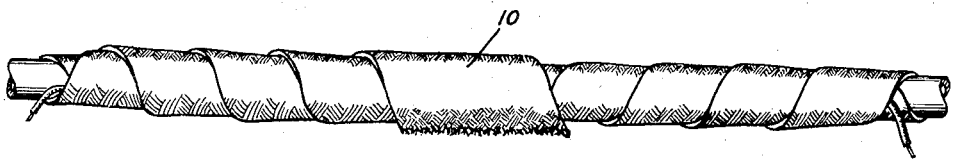
FIG. 2
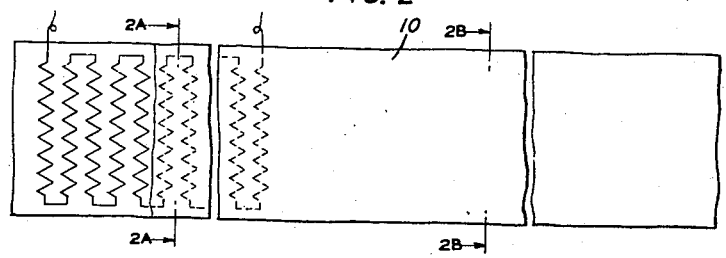
FIG. 2A     FIG. 2B
 
FIG. 3
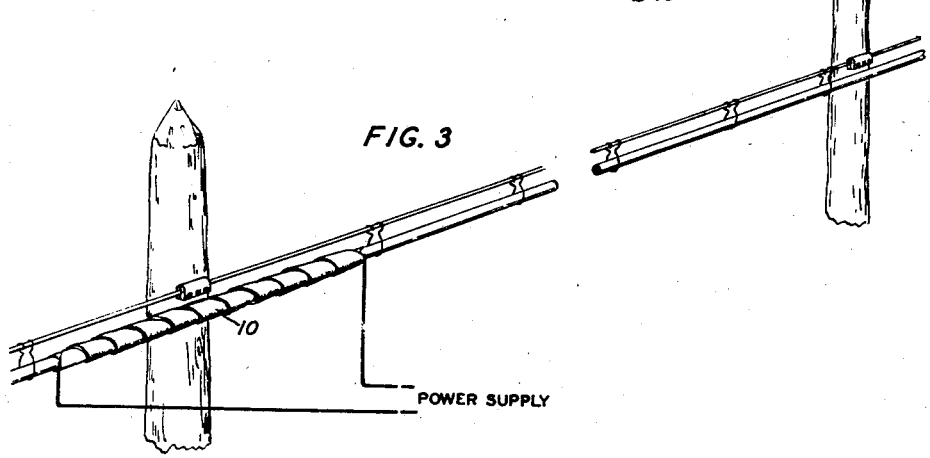
POWER SUPPLY
INVENTORS: G. M. BOUTON
E. E. SCHUMACHER
BY
ATTORNEY June 23, 1936.    G. M. BOUTON ET AL    2,044,763
MAINTAINING CABLE SHEATH
Filed Sept. 28, 1935    3 Sheets-Sheet 2
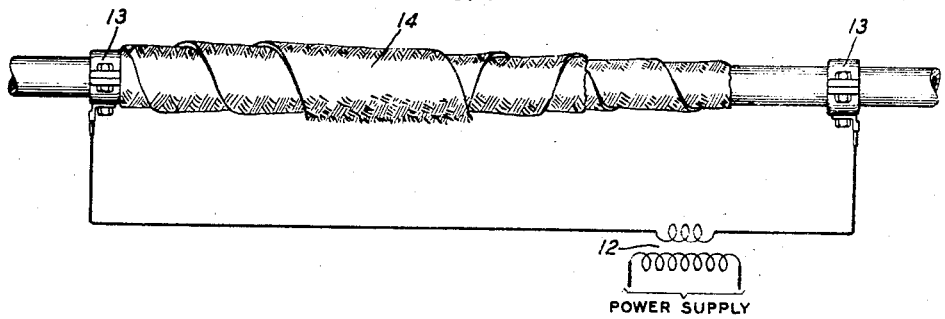
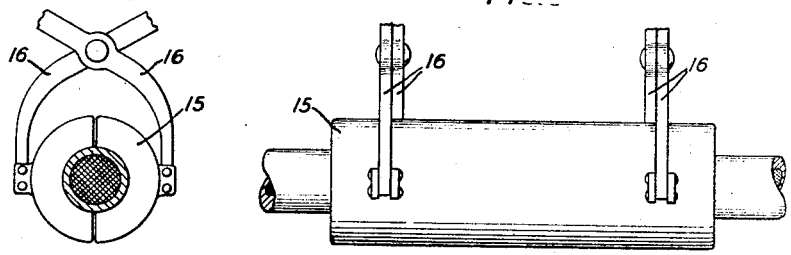
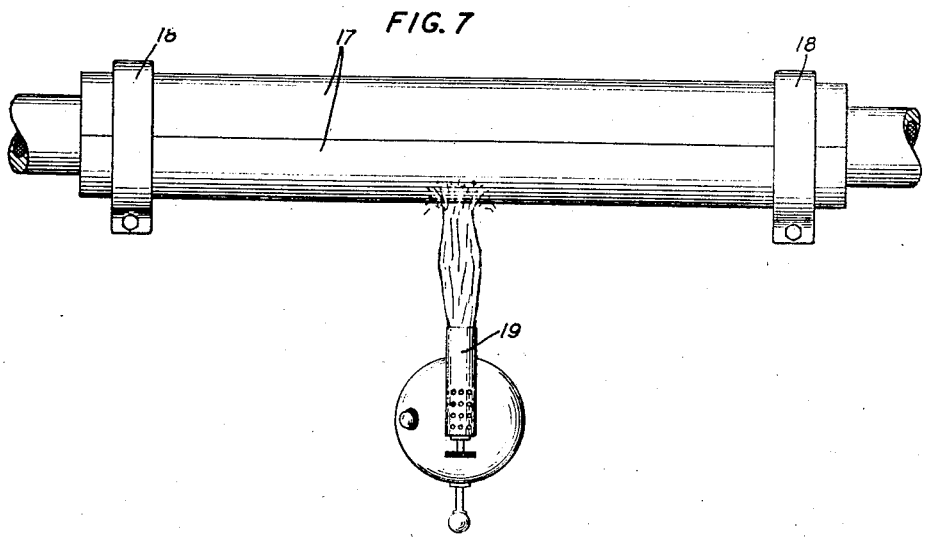
INVENTORS: G. M. BOUTON
E. E. SCHUMACHER
BY
ATTORNEY

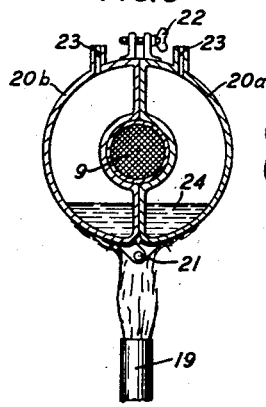
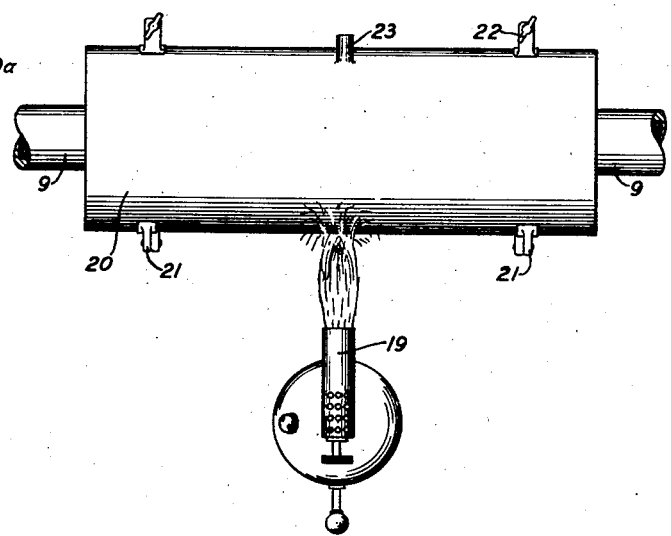
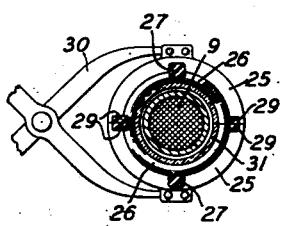
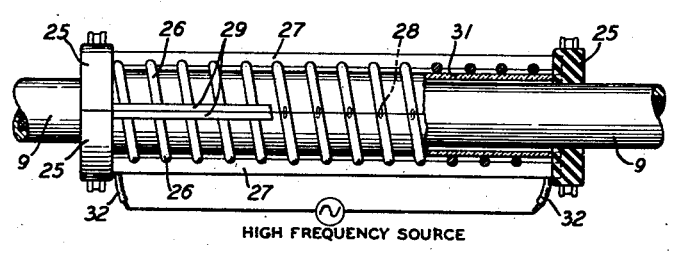
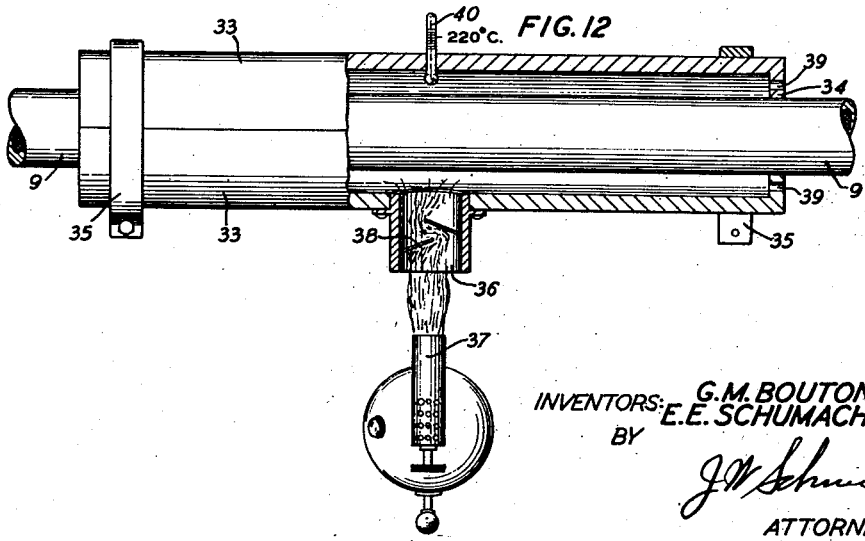

Patented June 23, 1936

2,044,763

UNITED STATES PATENT OFFICE

2,044,763

MAINTAINING CABLE SHEATH

George M. Bouton, Lynbrook, N. Y., and Earle E. Schumacher, Maplewood, N. J., assignors to Bell Telephone Laboratories, Incorporated, New York, N. Y., a corporation of New York Application September 28, 1935, Serial No. 42,566

6 Claims. (Cl. 148—21.4)

This invention relates to means for and methods of increasing the life of cables sheathed with lead and certain lead alloys by treating the cables in situ upon pole lines or in other places where deteriorated portions are likely to appear. Large quantities of telephone and other cables containing conductors insulated with paper or other materials and covered with a protecting sheath of lead or lead alloys, more especially an alloy consisting of about 99% lead and 1% antimony, are in service on pole lines. It has been observed that failures in sheath of such cable, in the nature of cracks, permitting the entrance of water and interfering with the serviceability of the cable or making its replacement necessary generally occur at certain localized positions whereat expansion and contraction of the cable with changes in temperature cause repeated bending and flexing. This bending and flexing is equivalent, in effect, to mechanical working of the cable at the bending and flexing points.

In a cable sheath consisting of 99% lead and 1% antimony the antimony is substantially entirely in solid solution when the cable sheath is freshly extruded because at the temperature of extrusion the lead will retain in solid solution about 2½% antimony. The antimony gradually precipitates out of the lead at ordinary temperatures until ultimately equilibrium is reached with about ¼% antimony in solid solution at ordinary room temperatures. Normally, this precipitation requires many years to reach the point of true equilibrium but it has been observed that mechanical working hastens the precipitation of the antimony and causes it to agglomerate. This agglomeration of antimony leaves sections of weakness in the sheath in which cracks can and do readily develop. These cracks constitute troublesome defects in the cable sheath. As stated above, it has been found by observation that most of the cracks develop at places where bows or bends in the cable occur.

The object of this invention is to so treat the cable at these bows or bends without removing it from its position on pole lines as to prevent the formation of the cracks or to impede the propagation of cracks already developed. In general, the invention is not limited to treating the cable at particular points as the entire cable may be treated if such procedure is found to be advantageous or commercially desirable. Specifically, however, the intention is to treat the cable only in those limited portions where failures most frequently occur. The useful life of the cable may thus be increased with an expenditure small compared to the cost of new cable.

By heating cable sheath of the specific kind containing 1% antimony in technically pure lead to a temperature of between 200° C. and 220° C. for five minutes, a large part of the precipitated antimony may be put back into solid solution, thus making the sheath similar metallurgically to freshly extruded sheath. It is possible also that small incipient cracks or partial cracks already formed may be wholly or partially healed but it is established that the propagation of cracks will be delayed by heating in the manner stated. Lower temperatures may be used if the time for treatment is increased. Temperatures of from 150° C. to 165° C. will cause most of the antimony to go back into solid solution if the heating is continued for a sufficiently long time, for example, one-half an hour to an hour; still lower temperatures will require still longer time. Temperatures below 110° C. not sufficiently effective to be commercially useful.

It has also been determined that the cable sheath may be heated to temperatures as high as 220° C. for five minutes without causing any noteworthy or important deterioration of the paper insulation of the conductors of the cable. Temperatures as high as 240° C. may be employed for a time much shorter than five minutes.

Other cable sheathing compositions subject to similar deterioration may be treated by similar methods with similar results.

For treating any given portion of the cable a suitable length, for example, several feet, may be freed from its supports if it is supported along the length to be treated. Any one of several different means or methods may then be employed for accomplishing the desired heating.

In accordance with a first method, the cable may be surrounded with a heating pad in the form of an asbestos blanket containing a network of nichrome or other suitable heater wires. The asbestos between the heater wires and the cable sheath may be very thin but it is desirable that it be thicker on the outside of the heater wires for the purpose of more effectively retaining heat. Other extra insulation may be added around the outside of the wires within the heating pad or outside of the heating pad itself if desired. Suitable terminals of the heater wire network are brought out and current supplied by a suitable source, such as a large storage battery, a generator on a truck, or a step down or other suitable ratio transformer having its primary connected to a power line. Current is caused to pass through the heater wires while the heating pad is wrapped around the portion of the cable to be heated. In this manner the treated portion of the sheath may be heated up to any desired temperature, such as 150° C. to 220° C. for a suitable length of time.

In accordance with another method, a pair of closely fitting copper sleeves are connected to the cable sheath at points several feet apart to act as electrodes, for the application to the sleeves of a voltage which will pass a current of from 1000 to 5000 amperes through a section of the cable sheath, the exact current required being dependent upon the total cross-section of the sheath upon a particular cable and the temperature desired. A heat insulating covering may be wrapped around the cable between the copper sleeves to more effectively retain the heat, although this may not be necessary.

Another method is to apply to the cable preheated metal forms.

Another method is to place around the section of the cable to be treated a heavy sleeve consisting of material of the same composition as the cable sheath itself or of material having a similar or slightly lower melting point. This sleeve may be heated by application of heat in any suitable manner as, for example, by a blow torch and danger of overheating the cable sheath is overcome because the sleeve will melt before the cable sheath approaches the melting point.

Another method is to surround the section of the cable to be treated with a hollow concentric heater in which is placed a liquid having a sufficiently high boiling point. This liquid may be heated to the desired temperature, usually around 200° C., in any one of several suitable ways such, for example, as by applying a blow torch. The circulation of the fluid in the concentric heating unit will cause the cable to heat uniformly.

Still another method is to heat the section of cable inductively. This can be accomplished by applying a split induction coil so designed as to induce in the sheath sufficient current to heat it to the desired temperature.

Another method is to surround the section of cable to be treated with a loosely fitting insulating sleeve and to circulate through the sleeve hot gases from a flame. These gases are caused to flow in the space between the cable and the sleeve.

Another method is to paint the sheath with some liquid, a paraffin oil for example, that has a boiling point near the temperature at which it is desired to heat the sheath and then to apply a flame to the sheath until its temperature is raised sufficiently high to vaporize the liquid. The disappearance of the coating serves as a guide to show when each region has been heated to the desired temperature. Overheating of the sheath with the accompanying danger of melting is impossible as long as the liquid is present on the region being heated. Should the heat treatment resulting from one vaporization of the liquid be insufficient to modify the sheath structure, the operation can be repeated until the desired modification is obtained.

Combinations of the above methods or obvious modifications of them to fit particular circumstances are contemplated.

After any of these treatments, the extent of subsequent hardening of the sheath may be controlled by regulating the rate at which the sheath cools down to normal atmospheric temperatures. Such control of the cooling rate may be effected by gradually reducing the heat inflow to the sheath from the various heating appliances by leaving a heat insulating covering or blanket on the sheath after heating has been discontinued, by deliberately removing the heating appliances so as to effect an air quench, or by applying water or other substances to the hot sheath to produce drastic quenching. Which of these methods is employed will depend upon the particular composition of cable sheath being treated.

In the accompanying drawings,

Figs. 1, 2, 2A, 2B and 3 illustrate the practice of the first method, Fig. 1 being a perspective view of a portion of a cable surrounded by an asbestos heating pad, Fig. 2 being a diagrammatic view of a portion of the pad, Fig. 2A being a cross-sectional view of a portion of the pad containing heating elements, Fig. 2B being a cross-sectional view of the portion of the pad used to insulate the heating portion, and Fig. 3 being a perspective view of a portion of a pole line with the heating pad applied to the cable adjacent one of the poles;

Fig. 4 illustrates the practice of the second method in which copper conducting sleeves are applied to the cable sheath at points a few feet apart to act as electrodes for circulation of a heavy current through the cable sheath;

Fig. 5 is a side view and Fig. 6 is a cross-section illustrating the third method of applying preheated forms;

Fig. 7 illustrates the fourth method in which a sheath of the same composition as the cable sheath itself is fitted around the cable and heated;

Fig. 8 is a cross-section and Fig. 9 a plan view illustrating the practice of the fifth method in which a hollow concentric heater filled with a liquid of high boiling point is employed;

Figs. 10 and 11 are a cross-section and a side view, respectively, illustrating the practice of the sixth method in which the cable sheath is heated inductively; and Fig. 12 illustrates the method of circulating hot gases from the blow torch or other suitable source of hot gases around the cable sheath.

In Figs. 1, 2, 2A, 2B, and 3, there is shown a heating pad 10 which may be of any suitable form or dimensions to wrap around the portion of the cable 9 to be treated. As shown in Fig. 2, the heating pad may contain heating elements in about one-half its length and the other half may consist of nothing but asbestos cloth insulation. In applying the pad, the portion containing heating elements is wrapped around the cable first and the insulating portion applied on top thereof. Fig. 2A is a cross-section of Fig. 2 on the line 2A and Fig. 2B is a cross-section of Fig. 2 on the line 2B. In Fig. 3 is shown diagrammatically the appearance of the pad when applied to a cable at a point adjacent to a pole line. The legend "Power supply" indicates any suitable source of alternating or direct current of a voltage appropriate to the particular heating pad being used. It may ordinarily be assumed to be a commercial 110 volt power supply but a suitable generator mounted on a truck and driven by a gas engine may be employed in the case of cables having no conveniently near power supply.

In Fig. 4, the transformer 12 indicates a step-down transformer by means of which a relatively low voltage may be impressed upon the copper clamps 13, 13. In order to retain the heat in the cable sheath, the insulating blanket 14 is wrapped therearound to insulate the portion between the copper clamps. In employing this method for cables of small or ordinary dimensions, a large current of from 1000 to 5000 amperes may be necessary in order to heat the cable sheath to the desired temperature. Correspondingly greater current will be required in the case of cables having a heavy sheath, and obviously, the method is limited by the maximum current which the step-down transformer 12 is able to supply.

In Figs. 6 and 7, preheated forms 15 are mounted on handles 16 which may be pivoted together after the fashion of tongs. The forms 15 may be heated by means of a blow torch, a charcoal furnace or any other suitable manner, and after determining that they are at the proper temperature, they are applied to the cable sheath in a tightly fitting manner and allowed to remain either until cool or for a sufficient length of time. If necessary, the forms may be repeatedly heated and applied.

It will be understood that there may be some danger of damaging the cable sheath by overheating it and causing the melting of portions thereof. Fig. 7 illustrates how a heavy split sleeve 17 may be placed around the cable and temporarily fastened therearound by means of clamps 18 of any suitable metal. If the heavy sleeves 17 consist of a metallic alloy having the same composition as that of the cable sheath to be treated, it will be seen that the cable sheath cannot be melted by unskilled application of the source of heat because the sleeve will melt at the point where too much heat is applied and give notice to the operator that the temperature is too high. A flame from a blow torch 19 or a Bunsen burner may be played along the sleeves 17 to raise them to the required temperature.

Figs. 8 and 9 disclose in cross-section and side view a hollow split sheath 20 which consists of two portions, 20a and 20b, each forming a complete enclosure in itself. Each portion 20a and 20b is concave on its inner surface where it fits around the cable 9. The two portions are hinged together at 21 and are provided with suitable thumb screw 22 or other clamping device or several such clamping devices to hold them firmly in place. Openings 23 may be used to fill, or partly fill, the hollow sleeve with any suitable liquid of appropriate boiling point, for example, ethylene glycol. Upon heating the sleeves by means of a blow torch 19, the escape of vapor from the openings 23 indicates that the liquid 24 has reached the boiling point and the heat may then be lessened to an amount just sufficient to maintain the temperature at the boiling point for the required length of time. This method permits treatment of the cable sheath at a precisely controlled temperature because the liquid will not rise above the boiling point. Furthermore, the circulation of the vaporized liquid through the hollow sections 20a and 20b will cause the temperature to be uniform throughout the whole section of cable being treated except near the very ends where it will be lowered by conduction and radiation.

Figs. 10 and 11 illustrate the application of a split induction coil to a cable to heat the sheath thereof by induction currents from a high frequency source. The split inductance consists of two rings 25, each consisting of insulating material and each carrying semicircular conductive portions 26 which, when fitted together constitute an induction coil. The semicircular portions 26 are carried by insulating bars 27 and each half turn may be considered to have good conductive contact with the adjacent half ring by means of small conductive pins 28 mounted in one half ring and fitting into an aligned opening in the other half ring. The aligned ends of the half rings are carried by bars 29 by means of which they are brought into group contact when the split induction coil is applied to a cable 9. A tong arrangement 30 serves as a handle and facilitates the application of a split induction coil to the cable. Between the coils 10 and the cable sheath is located a shield 31 made of a suitable non-conducting and heat insulating material. The shield 31 is non-conducting to protect the cable sheaths from direct contact with the induction coil and heat insulating to retain the heat caused by the eddy currents set up in the sheath. The shield 31 may conveniently in practice be composed of asbestos fibers compressed together and bound with cement or other adhesive. The terminals 32 of the split induction coil are brought out for attachment to a suitable source of high frequency current which is designated by the legend "High frequency source". In general, this high frequency source may consist of an oscillating vacuum tube, a high frequency generator or any other suitable means for supplying relatively high frequency oscillations. The source may be adjustable as to frequency and power supplied to the split induction coil and it may, furthermore, include a transformer or any other desired transmission element or elements between the source proper and terminals 32.

In accordance with Fig. 12, a split insulating sleeve 33 having substantially closed end portions 34 is applied to the cable 9 by means of clamps 35. At the lower portion of split sleeve 33 is an opening 36 for the admission of hot gases from a flame producing device 37. The opening 36 may be suitably elongated or provided with baffle plates 38 to prevent localized overheating of the cable sheath at the point of admission of the gases. The gases flow into the split sleeves 33 at the opening 36 and make their exit at suitable openings 39 arranged preferably in the ends of the sleeves. If necessary or desirable, one or more thermometers 40 may be inserted in suitable small openings in one or both the sleeves 33 or the thermometers may be permanently mounted therein for observation of the temperature of the hot gases in the enclosed space.

What is claimed is:

1. The method of rejuvenating in situ cable sheath consisting of lead alloyed with other materials, which comprises heating a suitable section of the cable sheath to a temperature of from 110° to 240° C. and in any case to a sufficient temperature for sufficient time to cause the sheath to assume a metallurgical structure similar to freshly extruded sheath.

2. The method of improving cable sheath consisting of metals subject to deterioration with age and which may be improved by heating, which comprises applying heat externally to the cable sheath to heat the sheath hotter than 110° C. while in service without removing it from its position.

3. A method according to claim 2 including the further step of controlling the cooling rate of the cable sheath.

4. The method of improving the metallic sheath covering a system of electric conductors in service without removing the sheath from its position as applied in service which consists in utilizing electric currents to generate in the sheath a sufficient degree of heat to restore to solid solution constituents of the sheath material which have agglomerated and/or to alter the grain structure of the sheath material.

5. The method of improving the metallic sheath covering a system of electric conductors in service without removing the sheath from its position as applied in service which consists in utilizing heat from flames to generate in the sheath a sufficient degree of heat to restore to solid solution constituents of the sheath material which have agglomerated, and/or to alter the grain structure of the sheath material.

6. The method of increasing the life of a cable sheathed with an alloy of a metal composition which is subject to ultimate deterioration by agglomeration of a constituent of the alloy which consists in applying to the cable sheath heat to raise its temperature sufficiently for a sufficient length of time to restore the agglomerated constituent to solid solution, and/or to alter the grain structure of the sheath material.

GEORGE M. BOUTON.
EARLE E. SCHUMACHER.